No. 860,972. PATENTED JULY 23, 1907.
L. T. GIBBS.
APPARATUS FOR CONTROLLING THE MOTOR AND DRIVING MECHANISM OF SELF PROPELLED VEHICLES.
APPLICATION FILED SEPT. 21, 1905.
2 SHEETS—SHEET 1.
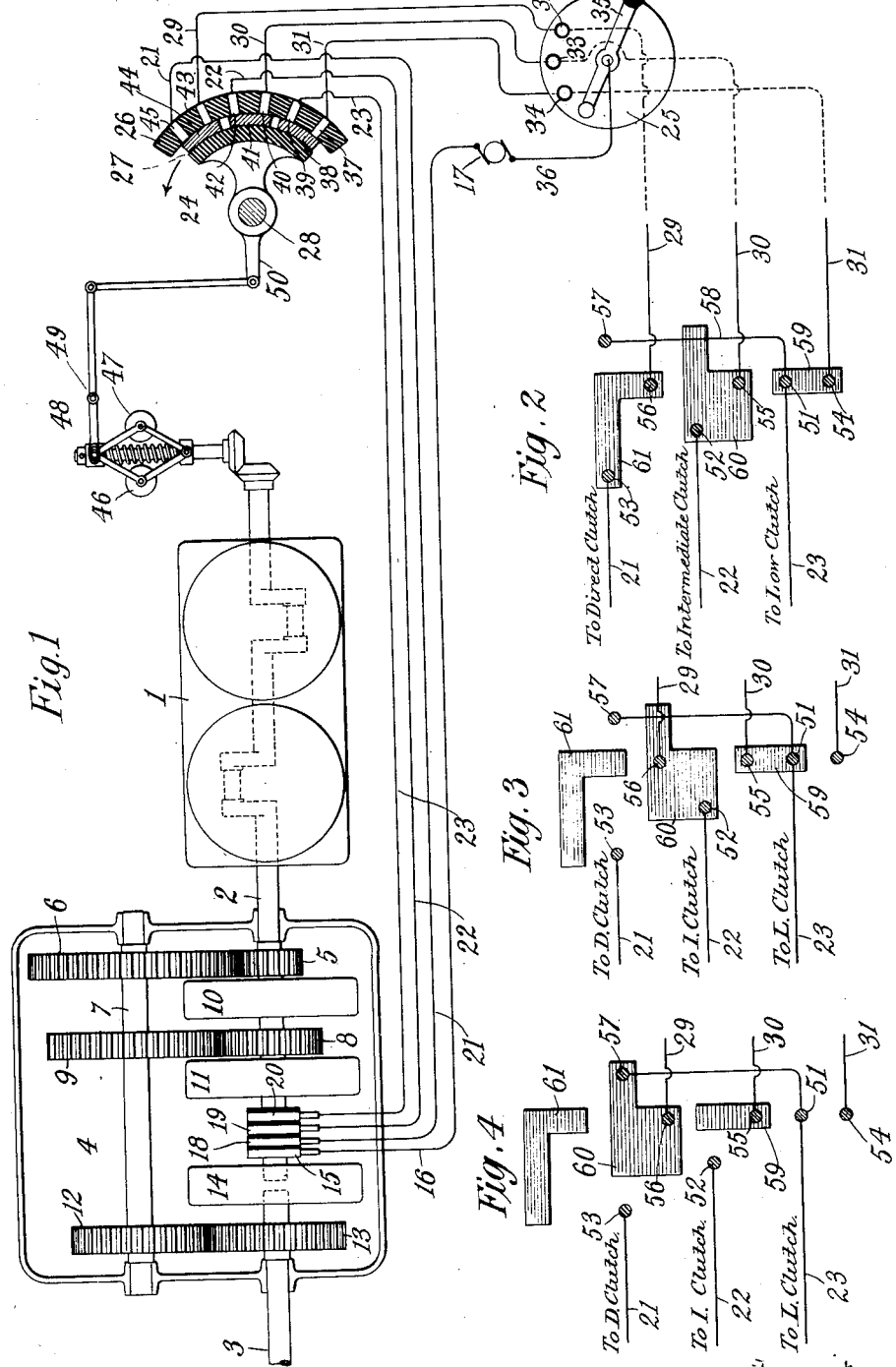
Witnesses
Raphail Vetter
AS Dunham
Inventor
L.T.Gibbs
By his Attorneys
Kerr, Page & Cooker No. 860,972. PATENTED JULY 23, 1907.
L. T. GIBBS.
APPARATUS FOR CONTROLLING THE MOTOR AND DRIVING MECHANISM
OF SELF PROPELLED VEHICLES.
APPLICATION FILED SEPT. 21, 1905.
2 SHEETS—SHEET 2.
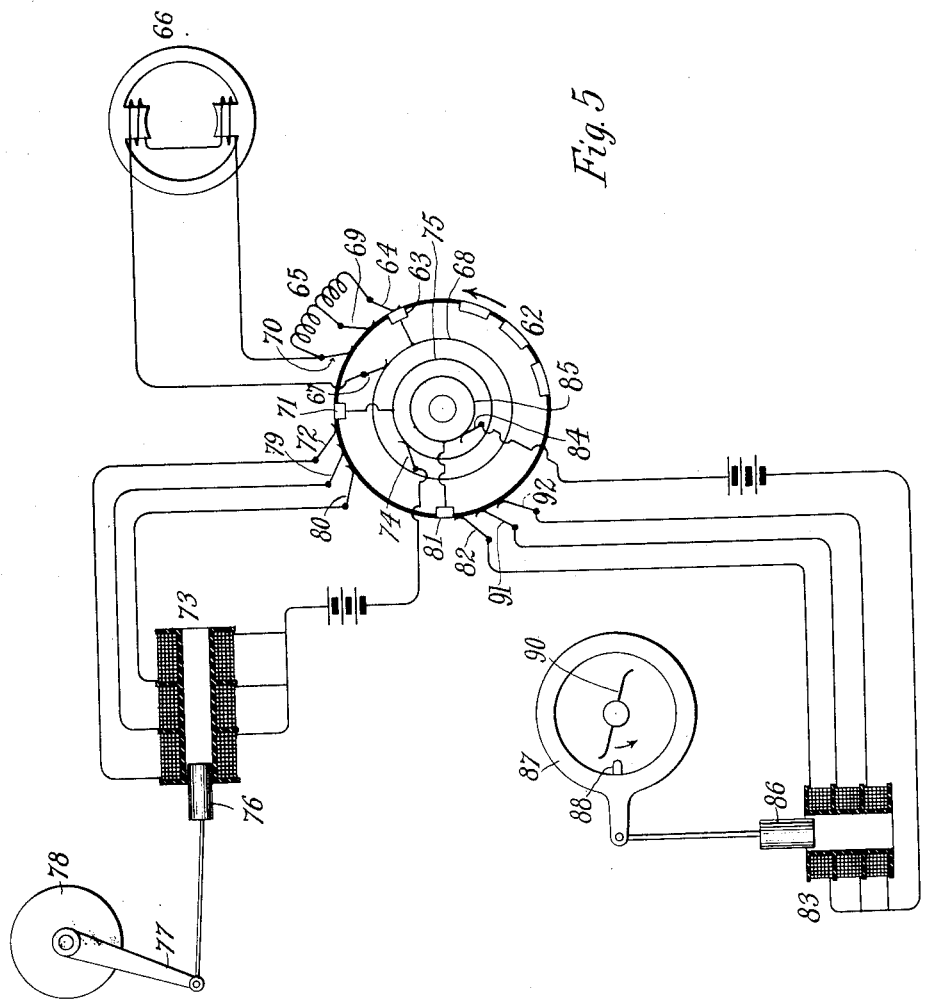
Witnesses
Raphaël Netter
S S Dunham
L. T. Gibbs, Inventor
By his Attorneys
Kerr, Page & Cooper

UNITED STATES PATENT OFFICE.

LUCIUS T. GIBBS, OF HEMPSTEAD, NEW YORK.

APPARATUS FOR CONTROLLING THE MOTOR AND DRIVING MECHANISM OF SELF-PROPELLED VEHICLES.

No. 860,972.   Specification of Letters Patent.   Patented July 23, 1907.

Application filed September 21, 1905. Serial No. 279,392.

*To all whom it may concern:*

Be it known that I, LUCIUS T. GIBBS, a citizen of the United States, residing at Hempstead, in the county of Nassau and State of New York, have invented certain new and useful Improvements in Apparatus for Controlling the Motor and Driving Mechanism of Self-Propelled Vehicles, of which the following is a specification, reference being had to the drawing accompanying and forming part of the same.

My invention in its preferred application relates to the control of the motor and driving mechanism of self-propelled vehicles, more particularly those driven by explosive engines through the instrumentality of variable-speed power transmission devices.

The chief object of my invention is to provide means for automatically controlling the motor and driving mechanism generally, so that the same will operate efficiently at all times. For example, in cars driven by explosive engines, it is customary to employ a plurality of transmission devices to transmit the motion of the engine to the driving wheels of the vehicle, the several transmission devices being used to give as many different speeds. These transmission devices are under the control of the operator, so that he may vary the speed of the vehicle at will. It may happen, however, that the engine is not powerful enough to drive the vehicle, as for example up a steep ascent, at the maximum speed of which it is capable on a level; hence if the operator or engineer should throw in the high speed transmission devices the engine would be stalled. This is an instance of the conditions which my present invention is designed to prevent. Under such conditions, in a car equipped with my invention, whenever the speed fell below a certain predetermined limit, thereby indicating that the power of the engine was being inefficiently applied in trying to drive the car at a speed too great for the load or the grade, the transmission device in use would be automatically disconnected or cut out and one for a lower speed brought into operation—in other words, the driving mechanism would be automatically regulated to give the maximum speed of which the engine is capable under the given conditions of load or grade, or both. At the same time, the speed of the car, as regards rates lower than this maximum, is still under the control of the operator. That is to say, the operator can reduce the speed of the car by throwing into operation a transmission device of lower speed-rate, but he cannot, through ignorance or carelessness, throw in one of higher speed-rate and thereby stall the motor. With this I may combine several other features, as for example, automatic control of the supply of steam, explosive mixture, or electric current to the motor to prevent waste of power, or to provide the most economical supply of power under the given conditions. Also I may add, in the case of an explosive engine, automatic means for advancing or retarding the ignition, so as to secure the most efficient application of the energy of the charge by properly timing the explosion; or, in the case of a steam engine, automatic means for controlling the cut-off to secure an efficient expansion of the steam in the cylinder; or, in the case of an electric motor, automatic means for regulating the potential delivered to it. The performance of all these functions is dependent, as before stated, upon fall of the speed of the motor, caused by over-loading. In other words, so long as the load is moving at a speed proportionate to the energy expended by the motor the automatic devices remain idle; but whenever the speed of the load falls below a predetermined limit for the given conditions, thereby indicating that the motor is too greatly overloaded, the automatic devices will come into action.

The invention therefore consists, essentially, in the provision of mechanism, actuated by variation of the speed of the motor, which controls the motive devices in such manner as to keep the same operating at maximum, or at least high, efficiency.

In the accompanying drawings, I have shown the preferred embodiment of the invention. The illustration thereof is somewhat diagrammatic, as the inclusion of mechanical details which any one skilled in the art could supply would complicate the drawing and render the same less readily understood.

In the drawings, Figure 1 is a diagram in plan, showing my invention applied to an explosive engine, for the purpose of automatically controlling the transmission apparatus which connects the engine with the load. Figs. 2, 3 and 4 are developments of the inner surface of the stationary part of the controller switch, showing also the shape and arrangement of the contacts on the movable member and three different positions which they may assume relative to the contacts on the stationary member. Fig. 5 is a diagram showing a system in which not only are the transmission devices controlled, but also the carbureter and the ignition devices of an explosive engine, and the field resistance of a dynamo.

Referring now more particularly to Fig. 1, 1 indicates an explosive engine, 2 is the driving shaft thereof, and 3 is the shaft connected with the load which is to be driven. In the present case the shaft 3 itself may represent the load. 4 is a variable-speed power-transmission mechanism of any suitable type, the precise nature of which is, in general, wholly immaterial to the broad principle of the invention. In the apparatus illustrated the shaft 2 carries a small gear 5 rotatable thereon and meshing with a gear 6 rigidly mounted on the countershaft 7, and a larger rotatable gear 8 in mesh with a rigid gear 9 on the countershaft.

10 and 11 are electromagnetically actuated clutches. When the clutch 10 is actuated the loose gear 5 becomes connected with the shaft 2, on which it at other times revolves freely, and transmits the motion of the shaft 2 to the gear 6 and countershaft 7. On the latter shaft is a gear 12 engaging a gear 13 in the shaft 3, so that the rotation of the countershaft will be imparted to the shaft 3, driving the same at a low speed, it being understood that the gears 12 and 13 are of the same size. When the clutch 11 is actuated the gear 8 becomes connected with the shaft 2, and drives the countershaft at intermediate speed and with it the shaft 3. Finally when clutch 14 is actuated the shafts 2 and 3 are directly connected, and the latter is then driven at the highest speed. It will be seen that when shafts 2 and 3 are connected directly, by clutch 14, the smaller gears 5 and 8 would be driven by the countershaft 4 and gears 6 and 9. If desired, this may be obviated by any well known "overrunning" clutch in gears 6 and 9, but such devices are common and well understood, so that I deem it unnecessary to illustrate the same. The electromagnetic devices of the clutches are all connected with a slip ring 15 on which bears a brush connected by a common return wire 16 with a source of current indicated at 17, as for example a dynamo or an electric battery. Three other slip rings, 18, 19, 20, are provided, connected with the clutches 14, 11 and 10, respectively, the slip rings having brushes connected by wires 21, 22, 23, respectively, through a controller 24 and engineer's switch 25, to the source of current 17, thereby providing a circuit for each clutch, so that the engineer by establishing the proper circuit may throw into operation any clutch desired. The controller 24 is composed of an arc-shaped stationary member 26, in which fits a correspondingly curved movable member 27, capable of partial rotations on an axis 28. The two members are provided with suitable contacts, for example of the kind more fully described hereinafter, by which the wires 29, 30, 31 from contacts 32, 33, 34 on the engineer's switch may be put in electrical connection with the wires 21, 22, 23.

The operation of the devices thus far described will be readily understood. For example, suppose the switch arm 35 is placed on button 34; the current will then flow through wire 36, switch arm 35, wire 31, contact 37 on the stationary member of the controller, contact 38 on the movable member, then contact 39 on the stationary member, wire 23, slip ring 20, clutch 10, slip ring 15, common return wire 16, back to the source of current 17. The clutch 10 being thus actuated the shaft 3 and its load are driven at low speed. With the switch arm on button 33, the circuit will be through wire 30, contacts 40, 41, 42, wire 22, slip ring 19, clutch 11, slip ring 15, return wire 16, to source 17, energizing clutch 11 and driving the shaft 3 at intermediate speed. With the switch arm on button 32, the circuit will be through wire 29, contacts 43, 44, 45, wire 21, slip ring 18, clutch 14, slip ring 15, return wire 16, to source 17, energizing clutch 14 and driving the shaft 3 at direct or high speed.

Let it now be supposed, with the current flowing through the circuit last described, that is, energizing the direct clutch 14, that the engine cannot develop power enough to drive the load at the speed-rate of that transmission device. In such case the speed of the engine falls off, thereby permitting the governor balls 46, 47 to approach each other. This raises the end 48 of the lever 49, depressing the arm 50 on the movable member 27 and rotating the latter in the direction of the arrow until contact 41 bridges the gap between contacts 42 and 43. The circuit formerly established is thus broken by contact 44 moving off of contact 43, and a new circuit is made as follows: wire 29, contacts 43, 41, 42, wire 22, slip ring 19, clutch 11, slip ring 15, wire 16, to source 17, thereby throwing the intermediate clutch 11 into operation and driving the load at intermediate speed, which, let us say is the highest speed at which the engine is capable of driving the load. If with a greater load the engineer had thrown in the intermediate clutch, thereby putting in a speed-rate which in the present case let us suppose is greater than the engine can maintain, a similar operation would take place, the current from button 33 now switching to contact 39 and thence to the low speed clutch 10. It will thus be seen that whenever the speed of the engine drops, by reason of its inability to carry the load at the speed for which it happens to be connected, the governor will cause the controller to break the existing clutch circuit and establish a new one through a clutch of a lower speed-rate. In other words, the driving mechanism is controlled automatically, and within certain limits the engine can never be stalled. It will be observed, however, that in the first example outlined above if the engine, having been disconnected from the direct transmission devices and connected to the intermediate, is still unable to carry the load and therefore continues to lose speed, it may become stalled, since further movement of the member 27 might be sufficient in extent to bring contact 41 over contacts 43 and 45, the position first occupied by contact 44, thus throwing the current again into the direct clutch 14. Similarly in the case in which the engineer's lever is on button 33, if the load is too great to be driven at intermediate speed. In this case further movement of the member 27 might carry its contact 38 over contacts 40 and 42 in the other and send the current through wire 22 and clutch 11 as before. The contacts on the controller members may, however, be arranged in such manner that one lower clutch after another may be brought into operation if the speed of the engine continues to fall, until the lowest is thrown in. An example of many possible arrangements for this purpose is shown in Figs. 2, 3 and 4. These figures are developments on a flat surface of the curved operating surfaces of the controller. The buttons or circular contacts therein shown are on the stationary member, and the angular contacts are on the movable member.

In each of the figures buttons 51, 52, 53 correspond to the contacts 39, 42, 45, respectively, on the stationary member 26, and buttons 54, 55, 56 correspond to contacts 37, 40, 43, respectively, on the same member, an additional button 57 being provided and connected by a wire 58 with button 51. The angular contacts 59, 60, 61, correspond to contacts 38, 41, 44 respectively, on the movable member 27. Let it be supposed now that the load is at rest or is moving at low or intermediate speed, and that the engineer has thrown his lever to button 32, thereby energizing direct clutch 14. If this speed-rate is too high the speed of the engine will fall off, and the movable member will rise; and if the reduction in speed is great enough it will carry the angular contacts out of their normal position, shown in Fig. 2, to the position shown in Fig. 3. In this position the current no longer flows, as in Fig. 2, from button 56 to contact 61, and through button 53 to the direct clutch; instead, the contact 61 has moved off of button 56, while contact 60 has moved up and bridged the gap between button 56 and 52, so that the current now flows to button 52 and thence to the intermediate clutch. If this gear also is too high, continued drop in speed may raise the movable member of the controller until the contacts thereon are in the position of Fig. 4. The current now flows from button 56 to contact 60 and button 57, and thence through button 51 and wire 23 to the low clutch. With the engineer's lever on button 33, the controller member being in the position shown in Fig. 2, the current would flow through the button 55, contact 60, button 52 and thence to the intermediate clutch. If this gear is too high the controller member may be raised until the contacts thereon are in the position shown in Fig. 3 whereupon the current then flows from button 55 to contact 59 and button 51 and thence to the low clutch. If even this gear is too high, further drop in speed may carry the movable member to its third position, Fig. 4, thereby breaking the last circuit, releasing the low clutch, and leaving the engine free from the load. The same result will occur in the other cases above described if the speed of the engine falls below a predetermined limit after the low clutch is thrown in, unless the controller be positively prevented from moving further than the positive position of Fig. 4, as by means of a stop suitably arranged in its path.

As before stated, the controller may be made to perform other functions besides determining the gear which the engine will be connected. In Fig. 5 I have shown diagrammatically a system in which not only the clutches are controlled, but also the carbureter of the explosive engine, the ignition, and the field resistance of a dynamo, as for example the dynamo employed to furnish current for the clutches or to light the vehicle. The latter control is for the purpose of keeping the voltage from the generator substantially constant, since the voltage would fall off as the speed of the engine fell, unless the field resistance of the generator were correspondingly reduced. In Fig. 5 the contacts shown at 62 are in the clutch circuits and correspond to those on the movable member of the controller 24. They may, of course, be similar to those shown in Figs. 2, 3, and 4, if desired.

On another segment of the movable member is a contact 63, on which bears a brush 64 with the resistance 65 in series with the field of the generator 66. The other terminal of the field winding is connected to a brush 67 bearing on a slip ring 68 in electrical connection with the contact 63 just mentioned. As the controller moves in the direction of the arrow, on account of fall of the speed of the engine, the contact 63 comes under brush 69, thus cutting out part of the resistance 65. Further movement of the controller will bring contact 63 under brush 70, cutting out still more, or all, of the resistance.

On another portion of the movable member is a contact 71, which as the controller rotates will be brought under a brush 72 connected with the first section of a solenoid 73, establishing a circuit through the said section and a brush 74 bearing on a slip ring 75 connected with the contact 71 just mentioned. The solenoid section thus energized draws in the plunger 76 connected with the valve lever 77 of the carbureter illustrated diagrammatically at 78. If the controller moves still farther the contact 71 will come under brush 79, establishing a circuit through the second section of the solenoid, thereby causing the plunger 76 to be drawn further into the solenoid and giving an additional actuation of the valve lever 77. Another step of the controller would connect the contact with brush 80, energizing the last section of the solenoid and drawing the valve arm 77 over still farther. It will be understood, of course, that the showing of the carbureter is merely diagrammatic and that the valve lever 77 may control the supply of hydrocarbon or the supply of air thereto or may serve to throttle the charge delivered from the carbureter to the engine, or otherwise regulate the charge.

On another part of the controller cylinder is a contact 81. At the first step of the controller the contact will be carried under brush 82, thereby establishing a circuit through the first section of a solenoid 83, brush 84, and slip ring 85 in electrical connection with contact 81, whereupon the plunger 86 is drawn down and the ring 87 partially rotated. The latter represents diagrammatically a well known type of electrical ignition or sparking mechanism of an explosive engine. On the inner surface of the ring is a contact 88, to be connected in the ignition circuit, and revolving inside the ring is a brush 90, to be connected with the other terminal of the circuit, so that the brush will engage the contacts and complete the circuit, thereby causing a spark to jump across the spark gap in the explosion chamber. These devices are common and well known and need not be further illustrated herein. The partial rotation of the ring 87 as above described carries the contacts 88, 89 farther along in the path of the brush, and so delays the engagement thereof and the consequent ignition of the charge. Additional movements of the controller will bring the contact 81 under brushes 91 and 92, energizing the remaining sections of the solenoid, drawing the plunger 86 still farther thereinto, and making the ignition still later. It will be obvious, of course, that if the plunger were connected with the opposite side of the ring the ignition would be advanced, instead of retarded.

Thus far I have described only the functions performed when the speed of the engine falls off, but it will be seen that substantially contrary effects will be produced when the engine speeds up. For example, suppose that with the engineer's switch on button 32, Fig. 1, thereby energizing the direct clutch, the controller 24 has broken that circuit and thrown in the intermediate clutch,—the engineer's switch remaining in the same position, however. If under these conditions the load be reduced, the speed of the engine would rise accordingly, the governor balls would move apart, and the controller member 27 would drop back to the next of its former positions. The high speed clutch would thus be energized again and the load would then be driven at the speed desired by the operator. The devices shown in Fig. 5 will be affected in a corresponding manner, as will be readily understood.

As before stated the illustration herein given is diagrammatic and merely illustrative of one form of the invention. The skilled engineer who undertakes to apply the invention can readily modify the mechanical embodiments of its various features and elements to adapt the same to any particular purpose or any particular type of engine, transmission devices, etc., and such changes or modifications are clearly within the scope of my invention as defined by the following claims.

What I claim is:

1. The combination with a motor, and a load to be driven thereby, of variable-speed power-transmission mechanism intermediate to the motor and the load, electromagnetic devices for varying the speed-rate of said transmission mechanism, and means dependent for actuation upon variation of the speed of the motor for controlling said electromagnetic devices, as set forth.

2. The combination with a motor, and a load to be driven thereby, of a plurality of power-transmission devices of different speed-rates intermediate to the motor and the load, electromagnetic devices for putting one or another of said transmission devices into operation, and means dependent for actuation upon variation of the speed of the motor for controlling the said electromagnetic devices, as set forth.

3. The combination with a motor, and a load to be driven thereby, of a plurality of electromagnetically actuated power-transmission devices of different speed-rates intermediate to the motor and the load, and automatic means for disconnecting the transmission device in operation and connecting a transmission device of different speed-rate, according to predetermined variation in the speed of the motor, as set forth.

4. The combination with a motor, and a load to be driven thereby, of a plurality of power-transmission devices of different speed rates intermediate to the motor and the load, electromagnetic devices for putting one or another of said transmission devices into operation, means under the control of the operator to energize one or another of the said electromagnetic devices and throw into operation the transmission device having the desired speed-rate, and means dependent for actuation upon fall of speed of the motor to deënergize the electromagnetic device then in use and energize an electromagnetic device controlling a transmission device of lower speed-rate, as set forth.

5. The combination with a motor, and a load to be driven thereby, of a plurality of electromagnetic power-transmission devices of different speed-rates intermediate to the motor and the load, circuits for the respective electromagnetic devices, means under the control of the operator for controlling the said circuits to bring into action any of the said electromagnetic devices at will, and means actuated by fall of speed of the motor to control the said circuits independently of the operator, as set forth.

6. The combination with a motor, and a load to be driven thereby, of variable-speed power-transmission mechanism intermediate to the motor and the load, and means actuated by variation of the speed of the motor to change the speed-rate of the transmission mechanism and to regulate the power developed by the motor, as set forth.

7. The combination with an explosive engine, and a load to be driven thereby, of variable speed power-transmission mechanism intermediate to the engine and the load, and means actuated by variation of the speed of the motor to change the speed-rate of the transmission mechanism and to regulate the explosive charge delivered to the engine, as set forth.

8. The combination with an explosive engine, and a load to be driven thereby, of variable-speed power-transmission mechanism intermediate to the engine and the load and means actuated by variation of the speed of the engine to change the speed-rate of the transmission mechanism, to regulate the explosive charge delivered to the engine, and to control the ignition thereof, as set forth.

9. The combination with a motor, and a load to be driven thereby, including an electric generator having a field resistance, of variable-speed power-transmission mechanism intermediate to the motor and the load, and means actuated by variation of the speed of the motor to control the field resistance of the generator, as set forth.

LUCIUS T. GIBBS.

Witnesses:
M. LAWSON DYER,
S. S. DUNHAM.